2,987,449
ENHANCEMENT OF 7-CHLOROTETRACYCLINE PRODUCTION

Philip Andrew Miller, Valley Cottage, and Joseph Jacob Goodman, Nanuet, N.Y., Newell Oscar Sjolander, Saddle River, N.J., and Jerry Robert Daniel McCormick, New City, N.Y., assignors to American Cyanamid Company, New York, N.Y., a corporation of Maine
No Drawing. Filed Feb. 23, 1960, Ser. No. 10,033
3 Claims. (Cl. 195—80)

This invention relates to a novel process of producing antibiotics of the tetracycline series and, more particularly, is concerned with an improved process of fermenting certain mutant strains of *Streptomyces aureofaciens* which produce high yields of 7-chlorotetracycline in the presence of certain substances which operate as additives.

During the past few years many metabolic products of the growth of bacteria and fungi have been isolated and found to possess valuable therapeutic properties. Among the newer and more effective of these is the antibiotic known as 7-chlorotetracycline produced by the use of *Streptomyces aureofaciens*. A method of fermentation and the product are described in U.S. Patent 2,482,055 to Benjamin M. Duggar.

In the past, many attempts have been made to increase the yield of 7-chlorotetracycline obtained with certain strains of *S. aureofaciens*, which normally produce very low yields of 7-chlorotetracycline, by fermenting media containing various substances which have been generally referred to in the art as additives. Typical of such substances is cosynthetic factor-1 whose effect in increasing the production of 7-chlorotetracycline by fermentation of mutant *S. aureofaciens* strain S1308 is described in the copending application of J. R. D. McCormick et al., Serial No. 798,857, filed March 12, 1959, now U.S. Patent No. 2,970,947.

According to the present invention, we have found 21 compounds each of which exerts a powerful additive effect when added to a fermentation medium inoculated with *S. aureofaciens* strain S1308, strain S1308-29, strain S1308-V146, or strain S1308-V237. When such a culture is grown under standard aerobic conditions, the amount of 7-chlorotetracycline produced is increased from 100 to 700 mcg./ml. to about 5,000 mcg./ml.

Viable cultures of *S. aureofaciens* strain S1308, strain S1308-29, strain S1308-V146, and strain S1308-V237 have been deposited with the American Type Culture Collection at Washington, D.C., and have been assigned accession numbers ATCC No. 12748 to strain S1308, ATCC No. 12749 to strain S1308-29, ATCC No. 12750 to strain S1308-V146, and ATCC No. 12751 to strain S1308-V237. These mutant *S. aureofaciens* strains are more fully described in the copending application of Growich and Miller, Serial No. 792,952, filed February 13, 1959. In an appropriate fermentation medium these mutant *S. aureofaciens* strains produce largely 7-chloro-5a(11a)-dehydrotetracycline with only from 100 to 700 mcg./ml. of 7-chlorotetracycline being produced. Surprisingly, however, when the additives of the present invention are added to such a fermentation medium the production of 7-chlorotetracycline is increased to about 5,000 mcg./ml. at the expense of the production of 7-chloro-5a(11a)-dehydrotetracycline.

Many of the additives of the present invention are lower alkanols. Others are polyhydric compounds. Some are monoximes and finally furil dioxime is useful. The additives of the present invention, with chemical formulae, are listed below and are numbered 1 to 21.

STRUCTURAL FORMULAE AND NAMES OF THE ADDITIVES USED IN THIS INVENTION (1) 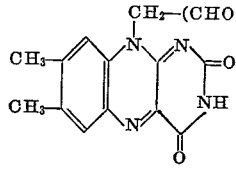
Riboflavin (2) $CH_2OH$
$CHOH$
$CH_2OH$
Glycerol (3) $HOCH_2-(CHOH)_4-CH_2OH$
Sorbitol (4) 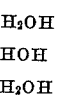
Barbaloin (5) $CH_3OH$
Methyl alcohol (6) $CH_3CH_2OH$
Ethyl alcohol (7) $CH_3CH_2CH_2OH$
Propyl alcohol (8) 
Iso-propyl alcohol (9) $CH_3(CH_2)_3OH$
n-Butyl alcohol

(10) $CH_3CH_2\overset{|}{C}HOH$
$\phantom{CH_3CH_2}\overset{}{CH_3}$
Sec. butyl alcohol

(11) 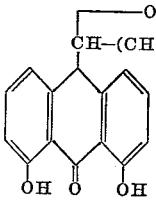
Tert. butyl alcohol

(12) 
Iso-butyl alcohol

(13) 
1,2-naphthoquinone-1-oxime

(14) 
Iso-butyraldoxime (15)

$$CH_3CH_2-\overset{NOH}{\overset{\|}{C}}-CH_3$$

2-butanone oxime (16)

$$CH_3-\overset{NOH}{\overset{\|}{C}}-CH_3$$

Acetone oxime (17)

2-hydroxybenzoquinone-1-oxime (18)

Furil dioxime (19)

2-furaldoxime

(20) $CH_3(CH_2)_2CH=NOH$ n-Butyraldoxime (21)

2-nitroso-5-hydroxybenzoquinone-4-oxime

It is not known how the additives of the present invention operate. They are chemically so widely different that it may well be that different mechanisms operate with different additives. Their chemical differences are so marked that they are not in any sense chemically equivalent. Their only equivalence being in the fact that they are all effective additives, although it is not known whether they operate in the same manner. No theory of why these diverse additive compounds operate is advanced. It is not intended that the present invention should be limited to any theory as to mechanism.

The method of producing 7-chlorotetracycline by employing the additives of the present invention in a fermentation medium inoculated with S. aureofaciens S1308, S1308–29, S1308–V146, or S1308–V237 may be used as well to produce tetracycline and 7-bromotetracycline. Tetracycline is produced when chloride ion is absent from the medium or a hologenation inhibitor is used. 7-bromotetracycline is produced when chloride ion is absent from the medium and bromide ion is substituted therefor.

Since some of the additives of the present invention are more effective than others, they will be used in differing amounts in the fermentation medium depending upon their activity. In general, however, they will be employed in concentrations of from about 0.001 to about 200.0 mg. per ml. of fermentation mash. In Table I which follows, the 21 additive compounds of the present invention are listed in descending order of activity. The activity, as is more fully brought out in the examples appended hereinafter, is expressed in micrograms of 7-chlorotetracycline produced per mg. of additive compound added. Also in Table I is set forth the preferred amount of each additive compound employed in mg. added to the fermentation medium per ml. of mash.

Table I

| No. | Additive Compound | Activity, mcg./mg. | Preferred amount of additive in mg. added per ml. of mash |
|---|---|---|---|
| 1 | Riboflavin | 508,000 | 0.001–0.005 |
| 13 | 1,2-Naphthoquinone-1-oxime | 14,800 | 0.01–0.10 |
| 15 | 2-Butanone oxime | 6,250 | 0.1–0.5 |
| 18 | Furil dioxime | 5,400 | 0.01–0.10 |
| 16 | Acetone oxime | 5,375 | 0.1–0.5 |
| 19 | 2-Furaldoxime | 4,200 | 0.01–0.10 |
| 14 | iso-Butyraldoxime | 3,220 | 0.1–1.0 |
| 17 | 2-Hydroxybenzo-quinone-1-oxime | 2,850 | 0.1–0.5 |
| 20 | n-Butyraldoxime | 2,160 | 0.1–1.0 |
| 12 | iso-Butyl alcohol | 1,986 | 1.0–5.0 |
| 21 | 2-Nitroso-5-hydroxybenzoquinone-4-oxime | 980 | 0.1–1.0 |
| 4 | Barbaloin | 877 | 1.0–5.0 |
| 7 | Propyl alcohol | 591 | 1.0–10.0 |
| 6 | Ethyl alcohol | 337 | 5.0–20.0 |
| 10 | sec. Butyl alcohol | 252 | 5.0–15.0 |
| 8 | iso-Propyl alcohol | 196 | 10.0–40.0 |
| 5 | Methyl alcohol | 189 | 10.0–30.0 |
| 2 | Glycerol | 119 | 15.0–40.0 |
| 9 | n-Butyl alcohol | 97 | 15.0–25.0 |
| 3 | Sorbitol | 31 | 25.0–75.0 |
| 11 | tert. Butyl alcohol | 27 | 25.0–200.0 |

Fermentations utilizing the additive compounds of the present invention are carried out in the usual manner. That is, the fermentation medium contains the usual nutrients and mineral substances. Nutrients which can be used include starch, dextrose, cane sugar, glucose, molasses, soybean meal, peanut meal, yeast, meat extracts, peptone, urea, corn steep liquor, distillers solubles, fish meal, and other conventional substances. The inorganic salts include such things as calcium carbonate, ammonium sulfate, ammonium chloride, and salts of the various trace elements such as manganese, cobalt, zinc, copper, iron, and the like. Suitable nutrient media and conditions of fermentation are more fully set forth in U.S. Patents 2,482,055 to B. M. Duggar, 2,609,329 to J. G. Niedercorn and 2,911,339 to J. J. Goodman.

An appropriate S. aureofaciens strain such as mutant S1308 (ATCC No. 12,748) is grown aerobically in a suitable inoculum medium. A typical medium used to grow the primary inoculum is prepared according to the following formula:

Ingredients: Amounts
    Sucrose _____ grams__ 20.0
    Corn steep liquor _____ milliliters__ 16.5
    Ammonium sulfate _____ grams__ 2.0
    Calcium carbonate _____ do____ 7.0
    Water to 1000 milliliters.

A 100 ml. aliquot of this medium is placed in a 500 ml. Erlenmeyer flask and sterilized by autoclaving for 20 minutes under 15 pounds per square inch pressure. Spores of mutant strain S. aureofaciens S1308 (ATCC No. 12,748) are washed from an agar slant into the flask with sterile distilled water to form a suspension containing approximately $10^8$ spores per milliliter. A 1.0 ml. portion of this suspension is used to inoculate the fermentation media in the examples which follow.

The present invention will be described in greater detail in conjunction with the following specific examples.

EXAMPLE 1

A fermentation medium consisting of the following ingredients was prepared:

| | Grams |
|---|---|
| $(NH_4)_2SO_4$ | 5.0 |
| $CaCO_3$ | 9.0 |
| $NH_4Cl$ | 1.5 |
| $MgCl_2 \cdot 6H_2O$ | 2.0 |
| $FeSO_4 \cdot 7H_2O$ | 0.06 |
| $MnSO_4 \cdot 4H_2O$ | 0.05 |
| $CoCl_2 \cdot 6H_2O$ | 0.005 |
| $ZnSO_4 \cdot 7H_2O$ | 0.1 |
| Corn steep liquor | 25.0 |
| Corn starch | 55.0 |
| Water to 1000 ml. | |

Twenty-five ml. aliquots of this fermentation medium were placed in each of two 250-ml. Erlenmeyer flasks and 0.5 ml. of lard oil was added to each flask. Then 0.002 mg./ml. of riboflavin was added to one flask, the other flask being retained as a control. The flasks were sterilized in an autoclave for 20 minutes under 15 lbs./sq. in. pressure, then cooled to room temperature (25°±5° C.). At this point, a 1.0 ml. portion of inoculum of mutant strain *S. aureofaciens* S1308 (ATCC No. 12,748) was added to each of the two flasks. The flasks were incubated at 25° C. for 120 hours on a rotary shaker operating at 180 revolutions per minute. Upon completion of the fermentation period the mashes were assayed for 7-chlorotetracycline content.

The above procedure was repeated exactly for each of the remaining eight additives listed in Table II except that the indicated amount of each additive was employed in each experiment in place of the riboflavin.

In Table II, the response is the increase in 7-chlorotetracycline production over the control due to the addition of the additive compound. The activity of each additive compound is expressed as mcg. of 7-chlorotetracycline produced per mg. of additive compound added.

Table II

| No. | Additive Compound | Conc. of Additive Compound, mg./ml. | Mash Assay | | | Activity, mcg./mg. |
|---|---|---|---|---|---|---|
| | | | Additive Mash Assay, mcg./ml. | Control Mash Assay, mcg./ml. | Additive Response, mcg./ml. | |
| 1 | Riboflavin | 0.002 | 1,100 | 84 | 1,016 | 508,000 |
| 2 | Glycerol | 26.0 | 3,350 | 255 | 3,095 | 119 |
| 3 | Sorbitol | 51.0 | 1,900 | 313 | 1,587 | 31 |
| 4 | Barbaloin | 1.3 | 1,370 | 230 | 1,140 | 877 |
| 8 | iso-Propyl alcohol | 20.0 | 4,360 | 448 | 3,912 | 196 |
| 9 | n-Butyl alcohol | 20.0 | 2,380 | 448 | 1,932 | 97 |
| 10 | sec. Butyl alcohol | 10.0 | 2,970 | 448 | 2,522 | 252 |
| 11 | tert. Butyl alcohol | 160.0 | 4,720 | 355 | 4,365 | 27 |
| 12 | iso-Butyl alcohol | 2.6 | 5,395 | 231 | 5,164 | 1,986 |

EXAMPLE 2

A fermentation medium consisting of the following ingredients was prepared:

|  | Grams |
|---|---|
| $(NH_4)_2SO_4$ | 5.0 |
| $CaCO_3$ | 9.0 |
| $NH_4Cl$ | 1.5 |
| $MgCl_2 \cdot 6H_2O$ | 2.0 |
| $FeSO_4 \cdot 7H_2O$ | 0.06 |
| $MnSO_4 \cdot 4H_2O$ | 0.05 |
| $CoCl_2 \cdot 6H_2O$ | 0.005 |
| $ZnSO_4 \cdot 7H_2O$ | 0.1 |
| Corn steep liquor | 25.0 |
| Corn starch | 55.0 |
| Water to 1000 ml. | |

Twenty-five ml. aliquots of this fermentation medium were placed in each of two 250-ml. Erlenmeyer flasks and 0.5 ml. of lard oil was added to each flask. The flasks were sterilized in an autoclave for 20 minutes under 15 lbs./sq. in. pressure, then cooled to room temperature (25°±5° C.). At this point, 15.0 mg./ml. of methyl alcohol was added aseptically to one flask, the other flask being retained as a control. Then a 1.0 ml. portion of inoculum of mutant strain *S. aureofaciens* S1308 (ATCC No. 12748) was added to each of the two flasks. The flasks were incubated at 25° C. for 120 hours on a rotary shaker operating at 180 revolutions per minute. Upon completion of the fermentation period the mashes were assayed for 7-chlorotetracycline content.

The above procedure was repeated exactly for each of the remaining two additives listed in Table III except that the indicated amount of each additive was employed in each experiment in place of the methyl alcohol.

In Table III, the response is the increase in 7-chlorotetracycline production over the control due to the addition of the additive compound. The activity of each additive compound is expressed as mcg. of 7-chlorotetracycline produced per mg. of additive compound added.

Table III

| No. | Additive Compound | Conc. of Additive Compound, mg./ml. | Mash Assay | | | Activity, mcg./mg. |
|---|---|---|---|---|---|---|
| | | | Additive Mash Assay, mcg./ml. | Control Mash Assay, mcg./ml. | Additive Response, mcg./ml. | |
| 5 | Methyl alcohol | 15.0 | 3,110 | 270 | 2,840 | 189 |
| 6 | Ethyl alcohol | 12.6 | 4,490 | 243 | 4,247 | 337 |
| 7 | Propyl alcohol | 5.1 | 3,245 | 231 | 3,014 | 591 |

EXAMPLE 3

A fermentation medium consisting of the following ingredients was prepared:

|  | Grams |
|---|---|
| $(NH_4)_2SO_4$ | 5.75 |
| $CaCO_3$ | 9.0 |
| $NH_4Cl$ | 1.75 |
| $MnSO_4 \cdot 4H_2O$ | 0.076 |
| $CoCl_2 \cdot 6H_2O$ | 0.0057 |
| Corn steep liquor | 30.0 |
| Corn starch | 57.0 |
| Water to 1000 ml. | |

Twenty-five ml. aliquots of this fermentation medium were placed in each of two 250-ml. Erlenmeyer flasks and 0.5 ml. of lard oil was added to each flask. Then 0.05 mg./ml. of 1,2-naphthoquinone-1-oxime was added to one flask, the other flask being retained as a control. The flasks were sterilized in an autoclave for 20 minutes under 15 lbs./sq. in. pressure, then cooled to room temperature (25°±50 C.). At this point, a 1.0 ml. portion of inoculum of mutant strain *S. aureofaciens* S1308 (ATCC No. 12,748) was added to each of the two flasks. The flasks were incubated at 25° C. for 120 hours on a rotary shaker operating at 180 revolutions per minute. Upon completion of the fermentation period the mashes were assayed for 7-chlorotetracycline content.

The above procedure was repeated exactly for each of the remaining eight additives listed in Table IV except that the indicated amount of each additive was employed in each experiment in place of the 1,2-napthoquinone-1-oxime.

In Table IV, the response is the increase in 7-chlorotetracycline production over the control due to the addition of the additive compound. The activity of each additive compound is expressed as mcg. of 7-chlorotetracycline produced per mg. of additive compound added.

Table IV

| No. | Additive Compound | Conc. of Additive Compound, mg./ml. | Mash Assay | | | Activity, mcg./mg. |
|---|---|---|---|---|---|---|
| | | | Additive Mash Assay, mcg./ml. | Control Mash Assay, mcg./ml. | Additive Response, mcg./ml. | |
| 13 | 1,2-Naphthoquinone-1-oxime | 0.05 | 1,400 | 660 | 740 | 14,800 |
| 14 | iso-Butyraldoxime | 0.50 | 2,250 | 640 | 1,610 | 3,220 |
| 15 | 2-Butanone oxime | 0.20 | 1,890 | 640 | 1,250 | 6,250 |
| 16 | Acetone oxime | 0.20 | 1,715 | 640 | 1,075 | 5,375 |
| 17 | 2-Hydroxybenzoquinone-1-oxime | 0.20 | 1,230 | 660 | 570 | 2,850 |
| 18 | Furil dioxime | 0.05 | 760 | 490 | 270 | 5,400 |
| 19 | 2-Furaldoxime | 0.05 | 850 | 640 | 210 | 4,200 |
| 20 | n-Butyraldoxime | 0.50 | 1,740 | 660 | 1,080 | 2,160 |
| 21 | 2-Nitroso-5-hydroxybenzoquinone-4-oxime | 0.50 | 985 | 490 | 495 | 980 |

What is claimed is:

1. In a process for the production of 7-chlorotetracycline wherein a 7-chloro-5a(11a)-dehydrotetracycline-producing strain of *Streptomyces aureofaciens* selected from the group consisting of strains ATCC 12748, ATCC 12749, ATCC 12750 and ATCC 12751 is cultivated in an aqueous nutrient medium, the improvement which comprises growing said organism in said medium in the presence of a lower alkanol having less than 6 carbon atoms until substantial antibacterial activity is imparted thereto.

2. In a process for the production of 7-chlorotetracycline wherein a 7-chloro-5a(11a)-dehydrotetracycline-producing strain of *Streptomyces aureofaciens* selected from the group consisting of strains ATCC 12748, ATCC 12749, ATCC 12750 and ATCC 12751 is cultivated in an aqueous nutrient medium, the improvement which comprises growing said organism in said medium in the presence of a polyhydric compound selected from the group consisting of riboflavin, glycerol, sorbitol and barbaloin until substantial antibacterial activity is imparted thereto.

3. In a process for the production of 7-chlorotetracycline wherein a 7-chloro-5a(11a)-dehydrotetracycline-producing strain of *Streptomyces aureofaciens* selected from the group consisting of strains ATCC 12748, ATCC 12749, ATCC 12750 and ATCC 12751 is cultivated in an aqueous nutrient medium, the improvement which comprises growing said organism in said medium in the presence of an oxime selected from the group consisting of 1,2-naphthoquinone-1-oxime, iso-butyraldoxime, 2-butanone oxime, acetone oxime, 2-hydroxybenzoquinone-1-oxime, furil dioxime, 2-furaldoxime, n-butyraldoxime and 2-nitroso-5-hydroxy-benzoquinone-4-oxime until substantial antibacterial activity is imparted thereto.

References Cited in the file of this patent

UNITED STATES PATENTS

| | | |
|---|---|---|
| 2,709,672 | Petty | May 31, 1955 |
| 2,739,924 | Lein et al. | Mar. 27, 1956 |